(12) United States Patent
Röström

(10) Patent No.: US 7,091,036 B2
(45) Date of Patent: Aug. 15, 2006

(54) METHOD AND APPARATUS FOR COMPOSTING ORGANIC MATERIAL

(75) Inventor: Claus Röström, Göteborg (SE)

(73) Assignee: Matti Saastamoinen, Iisalmi (FI)

( * ) Notice: Subject to any disclaimer, the term of this patent is extended or adjusted under 35 U.S.C. 154(b) by 338 days.

(21) Appl. No.: 10/474,470

(22) PCT Filed: Mar. 28, 2002

(86) PCT No.: PCT/FI02/00272

§ 371 (c)(1),
(2), (4) Date: Feb. 17, 2004

(87) PCT Pub. No.: WO02/083601

PCT Pub. Date: Oct. 24, 2002

(65) Prior Publication Data

US 2004/0123637 A1    Jul. 1, 2004

(30) Foreign Application Priority Data

Apr. 10, 2001 (DE) ............................ 200 10 746 U
Dec. 7, 2001 (FI) .................................. 20012411

(51) Int. Cl.
*C12M 1/02* (2006.01)

(52) U.S. Cl. ............................. 435/290.2; 435/290.3; 71/9; 71/11

(58) Field of Classification Search .................... None
See application file for complete search history.

(56) References Cited

U.S. PATENT DOCUMENTS

| 5,292,637 A | 3/1994 | Bohnensieker | 435/3 |
| 5,377,921 A | 1/1995 | Wirth | 241/29 |
| 5,753,498 A | 5/1998 | Ueda et al. | 435/290.2 |

FOREIGN PATENT DOCUMENTS

| DE | 3844700 A1 | 11/1990 |
| EP | 0647604 A1 | 4/1995 |
| EP | 1010680 A1 | 6/2000 |

OTHER PUBLICATIONS

Patent Abstracts for Japan, Pub. No. 10296217A, Hitachi, Ltd.
Patent Abstracts for Japan, Pub. No. 2000344590A, Denso Corp.

*Primary Examiner*—David A. Redding
(74) *Attorney, Agent, or Firm*—Harrington & Smith, LLP

(57) ABSTRACT

The present invention relates to a method for composting organic material, in which method organic material is transported to a bioreactor (1) where it is mixed and where material for regulating the oxygen content and bacteria and/or enzymes for agitation of composting process are added to it, and where organic material may compost, after which the composted material is removed outside the bioreactor to be stabilized. The invention also relates to a device for composting organic material, which device includes a bioreactor (1) with at least one filling and emptying opening (12, 13, 17) in order to fill and empty the bioreactor, and a transporting device (2) mixing the material inside the bioreactor (1) in order to transport the organic material to be composted and a mix it inside the bioreactor. Characteristic to the method in accordance with the invention is that organic material is transported by means of a mixing transporting device (2) upwards and then dropped down against a spreading element (16) and from there back to the transporting device thus spreading the organic material to a smaller particle size and the particles while falling down come into contact with oxygen and moisture of the air in the bioreactor (1). Characteristics to the device in accordance with the invention is that the bioreactor (1) includes a turning element (11) to direct the organic material to be transported with a transporting device (2) upwards and back to mainly opposite direction in respect with the transporting direction of the transporting device.

7 Claims, 2 Drawing Sheets

US 7,091,036 B2

METHOD AND APPARATUS FOR COMPOSTING ORGANIC MATERIAL

FIELD OF THE INVENTION

The present invention relates to a method for composting organic material, in which method organic material is transported to a bioreactor where it is mixed and where material for regulating the oxygen content and bacteria and/or enzymes for agitation of composting process are added to it, and where organic material may compost, after which the composted material is removed outside the bioreactor to be stabilized. The invention also relates to a device for composting organic material, which includes a bioreactor with at least one filling and emptying opening in order to fill and empty the bioreactor and a mixing transporting device mixing the material inside the bioreactor in order to transport the organic material to be composted and to mix it inside the bioreactor.

BACKGROUND OF THE INVENTION

There are various methods today for composting organic material, such as biowaste and biomass and various devices to be employed while using them. Such devices are, for example, tunnel composters, drum composters and silo composters. The material to be composted in these composters is fed to the composter after which the composter is kept under certain circumstances such that the composting process begins and proceeds in a functional way. Air is fed to the composter during the composting process in some today recognized composters. This promotes the oxygen supply and the composting process.

Current composting methods are functional as such but the composting process continues for a relatively long period of time while employing them (usually several weeks) and is difficult to be controlled. Furthermore, while using currently known composting methods organic material composts heterogeneously and the proceeding of the stages of the process and the hygienesation may not be verified. Furthermore, there is, for example, a bad odour control in current composting methods and in special cases actual health hazards are caused to those working in connection with a composter.

SUMMARY OF THE INVENTION

The purpose of the invention is to provide a method and a device for composting organic material, which eliminate earlier mentioned disadvantages. Especially the purpose of the invention is to provide a method, which promotes organic material to compost clearly faster, more homogeneously and more flexibly than earlier and in which it is possibly to verify the proceeding of the composting process. Furthermore, the purpose of the invention is to provide a device, which is relatively simple and profitable and by employing of which the verifying of the hygienesation is managed to carry out reliably and simply.

The object of the invention is accomplished by a method and a device for composting organic material, the characteristics of which are presented in the claims.

Characteristic to the method in accordance with the invention is that organic material is transported by means of a mixing transporting device upwards and then dropped down against a spreading element and from there back to the transporting device thus spreading the organic material to a smaller particle size and the particles while falling down come into contact with oxygen and moisture of the air in the bioreactor. This is how particles of the organic material gain oxygen and moisture all the time evenly and the composting of organic material proceeds quickly and simultaneously in the whole material amount. Due to this it is possible to make organic material to decompost in clearly shorter period of time than while using earlier recognised methods and the raw compost is of higher quality and it is composted more homogeneously.

In an advantageous application of the method in accordance with the invention the organic material in a bioreactor is transported by a mixing transporting device against a hemispherical wall such, that the material turns following a spherical course upwards and falls back to the direction mainly opposite with respect to the transporting direction and downwards. Furthermore, the fallen organic material is directed against the wall opposite to the spherical wall, which is splitting the material in the bioreactor. This way it is possible to mix the organic material and to decompost it into material with a smaller particle size evenly and completely so that the supply of oxygen and moisture of the particles while falling is as even and efficient as possible.

In the second advantageous application of the method in accordance with the invention organic material is mixed in certain time intervals for suitable mixing periods. This way the microbiological functioning and the increasing of temperature due to it may be controlled such that the composting is possible to realize as efficiently and quickly as possible.

In the third advantageous application of the method in accordance with the invention the moisture content inside the bioreactor is adjusted during the composting process. A presumption of an efficient composting is, among other things, a suitable moisture content. By means of the moisture control devices of the bioreactor in accordance with the method the moisture content of the air in the bioreactor may he kept optimum the way other factors having influence on the decomposting of the organic material require. This is the way the best circumstances for the moisture content of the air are reached which, for its part, accelerates and increases the efficiency of the biological decomposting of the organic material.

In the fourth advantageous application of the method in accordance with the invention the acidity of the organic material is adjusted by measuring the ph-value of the organic material and by adding acidity regulating material to the bioreactor. Acidity of the organic material has influence on the functioning of bacteria decomposting the material. This is why by adding lime, for example, or some other suitable acidity control material the ph-value is possible to be kept as suitable as possible and the composting proceeds as efficiently and completely as possible also in terms of acidity.

Characteristic to the device in accordance with the invention is that the bioreactor includes a turning element to direct the organic material to be transported by the mixing transporting device upwards and back mainly to the opposite direction in respect with the transporting direction. Due to the turning element the organic material to be composted may be mixed in accordance with the method in a simple, reliable and profitable way such that all particles of the material come into contact with oxygen and moisture in the air.

In an advantageous application of the device in accordance with the invention the turning element is a hemispherical end wall of a bioreactor. This way it is possible to have a turning element directing the organic material in accordance with the method in accordance with the invention in the bioreactor simply and profitably without installing separate parts inside the bioreactor. Furthermore, due to this kind of an end wall there will be no corners gathering material in the joining points between the end wall of the bioreactor and other walls, where organic material to be composted could stick and clod.

In the second advantageous application of the device in accordance with the invention there is a spreading element in the bioreactor in order to spread the material directed by the turning element. Due to the spreading element the organic material is spread into particles of a small size and stays that way during the whole composting process. Due to this it is possible to control the supply of oxygen and moisture of all particles of the organic material evenly and controlled.

In the third advantageous application of the device in accordance with the invention the spreading element is a mainly v-shaped wall viewed from above, attached in diagonal position inside the bioreactor. A spreading element realized this way is simple and economical to manufacture. Furthermore, it is easily possible to manufacture this kind of a spreading element such that in it or due to it in other parts of the bioreactor there will be no such places which could gather or clod material such as different kinds of corners or hollows. Furthermore, it is possible to direct the organic material easily to desired direction while using this kind of spreading element, for example, back inside the bioreactor to the transporter.

In the fourth advantageous application of the device in accordance with the invention there is a composting part and a cleaning part inside the bioreactor and a spreading element is a separating wall between the composting part and the cleaning part. This way it is possible to make the inside of the bioreactor simple and economical to manufacture. Furthermore, this way there are less places which are separate from the walls and would easily gather and clod material inside the composting part and there is no need to build any special separating wall between the composting part and the cleaning part.

BRIEF DESCRIPTION OF THE DRAWINGS

Next, the invention will be explained in more detail with reference to the accompanying drawings, in which.

DETAILED DESCRIPTION OF THE INVENTION

Figure 1:
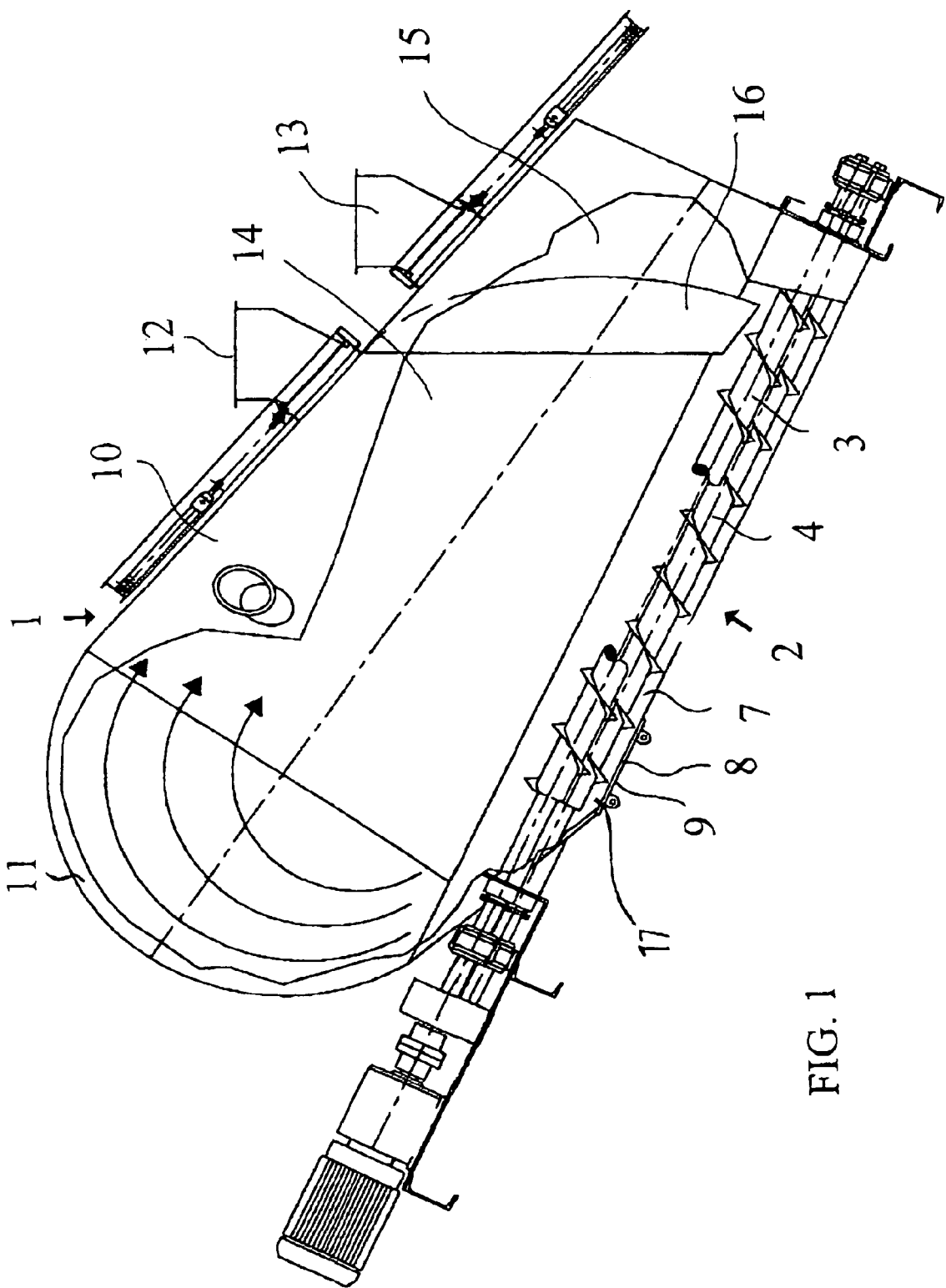
FIG. 1 illustrates a device in accordance with the method in accordance with the invention viewed from side.
Figure 2:
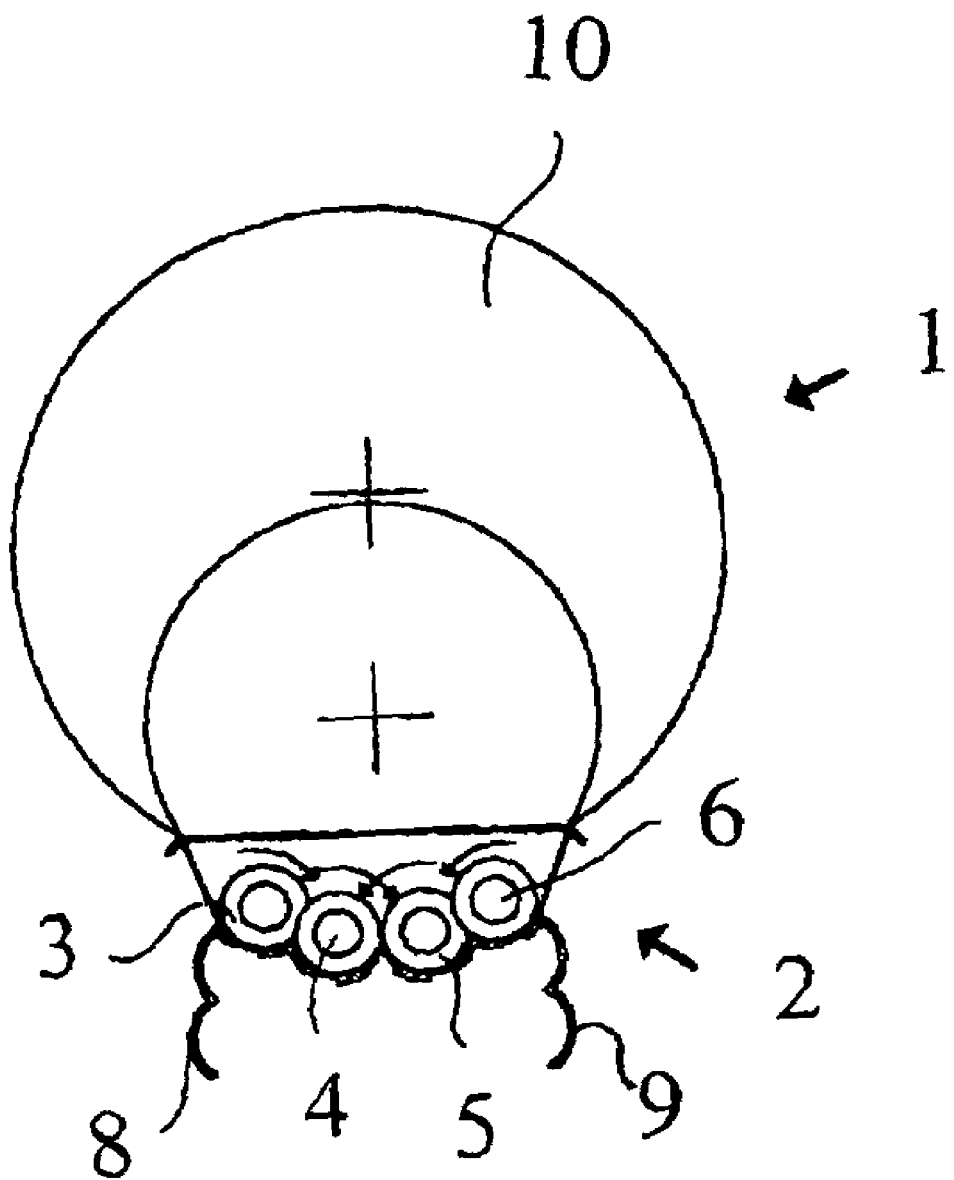
FIG. 2 illustrates a device in accordance with FIG. 1 viewed from ahead.

The device in FIGS. 1 and 2 includes a turnable, in inclined position on a suitable base attached bioreactor 1. It is a reservoir-like apparatus, which has been constructed from a conical part 10 closed with a vertical wall in the narrow end and a hemispherical end wall 11 functioning as a turning element and placed in the wider end. Both parts are, in this case, manufactured of a stainless Steel plate, which has been insulated on the outer surface with, for example, polyurethane. There is a bottom part 7 in the lower part of the bioreactor, a part of which is an emptying opening 17 with openable emptying hatches 8 and 9. There is a transporter 2 mixing material and constructed from screws 3–6 placed near the bottom part in the lower part of the bioreactor. The inside of the bioreactor has been divided into a composting part 14 and a cleaning part 15 with a separating wall 16. For filling the composting part 14 with organic material there is a filling opening 12 of the composting part in the upper part of it. Correspondingly there is a filling opening 13 of cleaning part for adding the cleaning material in the cleaning part 15. As illustrated in FIG. 1 the filling openings 12 and 13 are equipped with square in crosssection pipe collars and closing plates located in the lower part of the pipe collars to make the filling easier and to close the filling opening during the composting process. There is an opening in the lower part of the composting part 14 where the screws are which is as broad as the screws 3–6 and as long as the thread part of the screws and the opening is covered with a bottom part 7 following the shape of the screws under the screws as illustrated in FIG. 2. Emptying of the organic material is carried out, in this application, through the emptying hatches 8 and 9 joined with hinges to the emptying opening 17 of the bottom part 7. Furthermore, the device in accordance with FIGS. 1 and 2 includes an inclining device (not illustrated in FIGS. 1 and 2). It includes an inclining mechanism functioning by means of hydraulic cylinders in order to incline the bioreactor, for example, into inclined position in accordance with FIG. 1. In the application in accordance with FIG. 1 the angle of inclining may be regulated from horizontal position to about 40' angle. The base of the device is a recognized base construction, by means of which the bioreactor with accessories may he attached to a desired location in a functional manner.

The transporter 2 mixing material of the device in accordance with FIGS. 1 and 2 has been constructed of screws 3–6. The screws are, in this application, recognized transporting screws for material run by an electric motor and they are mounted in bearings to the lower part of the reactor in accordance with FIG. 1. The threads of the screws 3 and 4 are of the same direction and in the opposite direction with the threads of the screws 5 and 6. The direction of the thread in all screws has been chosen such that the material fed to the composting part moves towards the end wall 11 and from the sides to the centre.

In the device in accordance with FIGS. 1 and 2 the turning element in accordance with the method is a hemispherical end wall 11 of the bioreactor. By means of it the material transported by the screws 3–6 may be turned inside the bioreactor through the upper part back to the narrower end of the bioreactor. Due to the spherical shape the material turns back also in the direction of the longitudinal axis of the screws as well as in the directions between the longitudinal and the transversal axes. This way the device in accordance with FIGS. 1 and 2 mixes the organic material such, that the material rises upwards and falls against the separating wall 16 and moves back from there to the screws 3–6. While falling the particles of the organic material to be composted come into contact with oxygen and moisture of the air in the bioreactor. The moisture content of the air in the bioreactor is controlled by the regulating and controlling system of the device such that the falling material always gains oxygen and moisture in suitable amount. The device includes, in accordance with the method in accordance with the invention, a spreading element in order to spread the material into a suitable small particle size. The separating wall 16 between the composting part 14 and the cleaning part 15 represents the spreading element in this application. For this reason it has been designed to be v-shaped viewed from above such that the point of the v-shape is pointing to the direction of the composting part (transporting direction of the screws). This way the organic material inside the composting part is split mainly into two flows heading for the sides while falling against the separating wall 16. This crushes and spreads possible material clods and lumps into a smaller size thus keeping the material, in respect with the oxygen and moisture supply, in advantageous form with a small particle size.

Regulating and controlling system (not illustrated in FIGS. 1 and 2) includes, in this case, an air supply system, a measuring equipment for oxygen and moisture content and for temperature, a computer, a controlling and measuring card installed into the computer as well as a suitable computer programme to control various functions in an earlier determined manner. The probes measuring oxygen and moisture contents as well as temperature of the organic material to be composted have been placed in suitable places inside the bioreactor and connected to the earlier mentioned measuring and controlling card. By means of the air supply system (not illustrated in FIGS. 1 and 2) controlled by the computer it is possible to supply air into the bioreactor and to control the moisture content of the air in the bioreactor in accordance with an earlier determined moisture curve. This way it is possible to have as ideal circumstances as possible for the decomposting of material in respect with the oxygen and moisture content of the air in the bioreactor.

There is an air supply opening constructed to a side of the conical part 10 of the bioreactor 1 for the air supply system to which opening an air supply channel being a part of the system has been connected and to the opposite side to the other side of the conical part an outlet has been constructed to which the air outlet channel has been connected. The air supply channel has been connected to a fan equipped with a dehumidifier and the outlet channel has been connected to a filter. The dehumidifier has a recognized construction to remove moisture from the air to be blown to the air supply channel. The filter is, in this case, a so-called biofilter, which is an earlier recognized construction. Hazardous organic gases possible been created in the outlet air which otherwise would cause earlier mentioned bad odour related to earlier recognized equipment may be removed from the air in the bioreactor by means of it.

While employing the device in accordance with FIGS. 1 and 2 the composting part 14 of the bioreactor is filled through the filling opening 12 with some suitable compostable organic material. These are various biomasses, such as organic waste from food manufacturing industry and organic community waste. After this the material for regulating the oxygen content is added to the composting part 14, which material is some rough material such as sawdust, which increases the oxygen content of the organic material to be composted in a suitable manner. Next the reactor part is turned to a suitable inclined position and the screws 3–6 functioning as a mixing transporter 2 are started and the organic material and the material for regulating the oxygen content begin to mix. Mixing continues for some time in this stage, usually from half an hour to an hour, after which mixing is stopped for a while. Suitable aerobic bacteria depending on the material to be composted may be added to the material to be composted during the mixing process to agitate the composting process. After starting the mixing also the regulation of the oxygen and moisture content is started by means of the air supply system. This is carried out by blowing air (which may be moisturized while needed) to the bioreactor through the air supply channel in accordance with the earlier determined programme which is a part of the regulating and controlling system taking account of the continuous measurements of oxygen and moisture contents as well as temperature in the bioreactor. After the first mixing stage the screws are stopped and the composting circumstances are regulated. To keep the air supply in needed level the screws and the air supply system are started and run in suitable periods (usually about 10 min. at intervals of an hour). The suitable duration of periods is determined by the results from the measuring probes such that the oxygen and moisture content and the temperature will stay on the planned level. This stage is carried out until the temperature and the duration in this temperature according to the requirements for the composting of this composting material are achieved. The regulating programme in use may be chosen with respect to the content of the organic material to be composted from the programme library saved in the memory of a computer. Usually the oxygen content is kept constant and the moisture content is regulated in respect with the organic material in accordance with a earlier determined moisture curve. The temperature may not be regulated directly but the regulation of the temperature is carried out indirectly by means of other regulating measures. Too great an increase in temperature has a slowing effect on bacteria activity so the most effective decomposting is achieved in temperature depending on the proceeding of the composting process and the bacteria in use. Usually in the end of the composting process the temperature of 55–800 C. is achieved. This stage (so called raw compost) is achieved in 20–30 hours after filling the device using suitable bacteria. After this the emptying hatches in the bottom part are opened and the bioreactor is emptied by using the screws to a suitable transporter, for example, which transports the material to be stabilized in a suitable place such as to a pile outdoors made for this. After stabilizing the composted material is ready to use as desired, for example, as plant fertilizer.

The method in accordance with the invention may differ in many ways from the above mentioned example application. It may comprise, for example, stages realized in different ways and with different composting parameters and duration. Furthermore, in some applications the controlling of the process in accordance with the method may comprise, for example, measurements and regulations of various parameters. The regulation of acidity of the material to be composted based on pH measurements is one of those. In that case the acidity of the organic material is regulated by adding suitable acid control agent to the bioreactor. The input of the acid control agent may be organized to occur automatically or it may be carried out manually based on calculations and instructions of the computer of the device.

The device in accordance with the method in accordance with the invention may also be realized in many ways differing from the example device illustrated in FIGS. 1 and 2. For example, the shape, size and the material of the parts of the bioreactor as well as the number, size and the thread of the screws of the mixing part may vary. The conical part of the bioreactor, the hemispherical end wall, the filling and emptying hatches as well as the separating wall as a spreading element may be constructed of some other suitable material such as various kinds of alloys, aluminum, composite materials or some suitable plastic instead of a stainless steel plate. The angle and position of the separating wall functioning as a spreading element between the composting part and the cleaning part may vary from the position in FIG. 1, for example, depending on for what kind of materials the device in question is meant and on what speed this material is transported and mixed inside the bioreactor. Naturally, the spreading element as well as the turning element may be separate parts from the wall of the bioreactor placed inside the composting part in some applications. Also other parts of the device may be by construction realized as desired differing from the application in FIGS. 1 and 2 such that by means of them a functional device is provided to realize a method in accordance with the invention.

The invention is not limited to the presented advantageous application but it can vary within the frames of the idea of the invention formed in the claims.

The invention claimed is:

1. A method for composting organic material, in which method organic material is transported to a bioreactor (1), where it is mixed, and where the material regulating the oxygen content and bacteria and/or enzymes for agitation of composting process are added to it and where organic material may compost, after which the composted material is transported for stabilization outside the bioreactor, characterized in that the organic material in the bioreactor (1) is transported by the mixing transporting device (2) upwards against an upper hemispherical wall (11) such, that the material turns following mainly spherical course upwards and falls down to the direction mainly opposite in respect with the transporting direction and down, and that the fallen organic material is directed against a V-shaped wall (16) splitting the material and which is positioned opposite the hemispherical wall (11) of the bioreactor (1) and from there back to the transporting device thus spreading the organic material to a smaller particle size and the particles while falling down come into contact with oxygen and moisture of the air in the bioreactor (1).

2. A method in accordance with claim 1, characterized in that the organic material is mixed in certain intervals for suitable mixing periods of time.

3. A method in accordance with any of claims 1 or 2, characterized in that the moisture content of the air inside the bioreactor (1) is regulated during the composting.

4. A method in accordance with any of claims 1–3, characterized in that the acidity of the organic material is adjusted by measuring the pH-value of the organic material and adding acidity regulating material to the bioreactor (1).

5. A device for composting organic material, which includes a bioreactor (1), with at least one filling and emptying opening (12, 13, 17) to fill and to empty the bioreactor, and a mixing transporting device (2) for the material inside the bioreactor (1) for and mixing the organic material to be composted inside the bioreactor, characterized in that the bioreactor (1) includes a hemispherical wall (11) to direct the organic material to be transported with the transporting device (2) upwards and back to direction mainly opposite in respect with the transporting direction of the transporting device, and that the bioreactor (1) includes a V-shaped a wall (16) splitting the material and which is positioned opposite the hemispherical wall (11), to spread the falling material to a smaller particle size and to direct it back to the transporting device (2).

6. A device in accordance with claim 5, characterized in that the wall (16) splitting the material is a mainly v-shaped wall which is attached inside the bioreactor (1) in such a way that the sharp end of the wall points mainly to the transporting direction of the transport device (2).

7. A device in accordance with claim 5 or 6, characterized in that inside the bioreactor (1) there is a composting part (14) and a cleaning part (15) constructed, and that the separating wall between the composting part (14) and the cleaning part (15) is employed as the wall (16) splitting the material.

* * * * *